United States Patent

Buss et al.

[11] Patent Number: 5,419,080
[45] Date of Patent: May 30, 1995

[54] MULTI-CELLED TRAY FOR GROWING PLANTS

[75] Inventors: Melvin H. Buss, Burlington, Vt.; James F. Hinds, Heathfield, United Kingdom

[73] Assignee: Gardener's Supply, Burlington, Vt.

[21] Appl. No.: 648,171

[22] Filed: Feb. 1, 1991

[51] Int. Cl.⁶ .................................................. A01G 9/02
[52] U.S. Cl. ............................................ 47/87; 47/81; 47/73
[58] Field of Search .................. 47/87, 86, 85, 77, 81, 47/73

[56] References Cited

U.S. PATENT DOCUMENTS

| | | | |
|---|---|---|---|
| 3,092,284 | 6/1963 | Stout | 47/87 |
| 3,898,766 | 4/1975 | Goldstaub | 47/81 |
| 4,245,434 | 1/1981 | Green | 47/81 |
| 4,513,533 | 4/1985 | Gething | 47/86 |
| 4,753,037 | 6/1988 | Whitcomb | 47/87 |
| 4,926,587 | 5/1990 | Wingerden | 47/77 |
| 4,970,824 | 11/1990 | Visser | 47/86 |

FOREIGN PATENT DOCUMENTS

| | | | |
|---|---|---|---|
| 245312 | 2/1966 | Austria | 47/63 |
| 1414605 | 9/1965 | France | 47/81 |
| 7713224 | 6/1979 | Netherlands | 47/86 |
| 639241 | 11/1983 | Switzerland | 47/63 |
| 1511256 | 5/1978 | United Kingdom . | |
| 05247 | 12/1985 | WIPO | 47/79 |

OTHER PUBLICATIONS

Gardener's Supply Spring 1991 Catalog, pp. 2-3 (distributed Dec. 1990).

*Primary Examiner*—Henry E. Raduazo
*Attorney, Agent, or Firm*—Wegner, Cantor, Mueller & Player

[57] ABSTRACT

A tray assembly for containing plants is disclosed that has cells with an open top and side walls extending therefrom to a bottom floor of the cell having at least four holes, each defining an opening in the floor of 0.75 to 2.25 sq. in.

1 Claim, 5 Drawing Sheets

MULTI-CELLED TRAY FOR GROWING PLANTS

The present invention relates to a multi-celled tray for growing plants. This tray is especially useful for growing plants, which have been transplanted from containers with relatively smaller cells, until the plants are ready for transplanting in a garden environment. This invention further relates to a tray assembly comprising the multi-celled tray, a water reservoir, a capillary matting for delivering water through capillary action from the reservoir through holes in the bottom floor of cells in the tray to transplant mix contained in the cells, and means for supporting the capillary matting and the tray in the reservoir.

A multi-celled tray for growing plants from seeds or seedlings is known. Each cell of the known tray has a square top opening with tapered side walls ending in a bottom with a circular hole therein. Known trays are available with a capillary matting, a water reservoir, and a pegboard to support the capillary matting.

It has been discovered that currently available trays are insufficient for growing larger, more mature plants, particularly plants which develop a large root growth. The individual cells are too small for growth of such larger plants, and the hole in the bottom of a cell is too small to provide sufficient water for the larger plants.

Accordingly, the present invention provides a tray assembly for containing plants comprising cells having an open top and side walls extending from the top to a bottom floor, wherein the floor of each cell has at least four holes therein, each having an area of 0.75 to 2.25 sq. in.. The multi-celled tray of the present invention contains sufficiently large cells designed for the growth of larger and more mature plants, such as tomato transplants, which require vigorous and stocky growth. Therefore, larger, healthier plants can be grown in the multi-cell tray of the present invention with less root-binding. Furthermore, the multiple holes in the floor of each cell provide sufficient water to the transplant mix contained in the relatively large cells of the present multi-cell tray, yet retard the loss of transplant mix, because each hole has a sufficiently small area.

Figure 1:
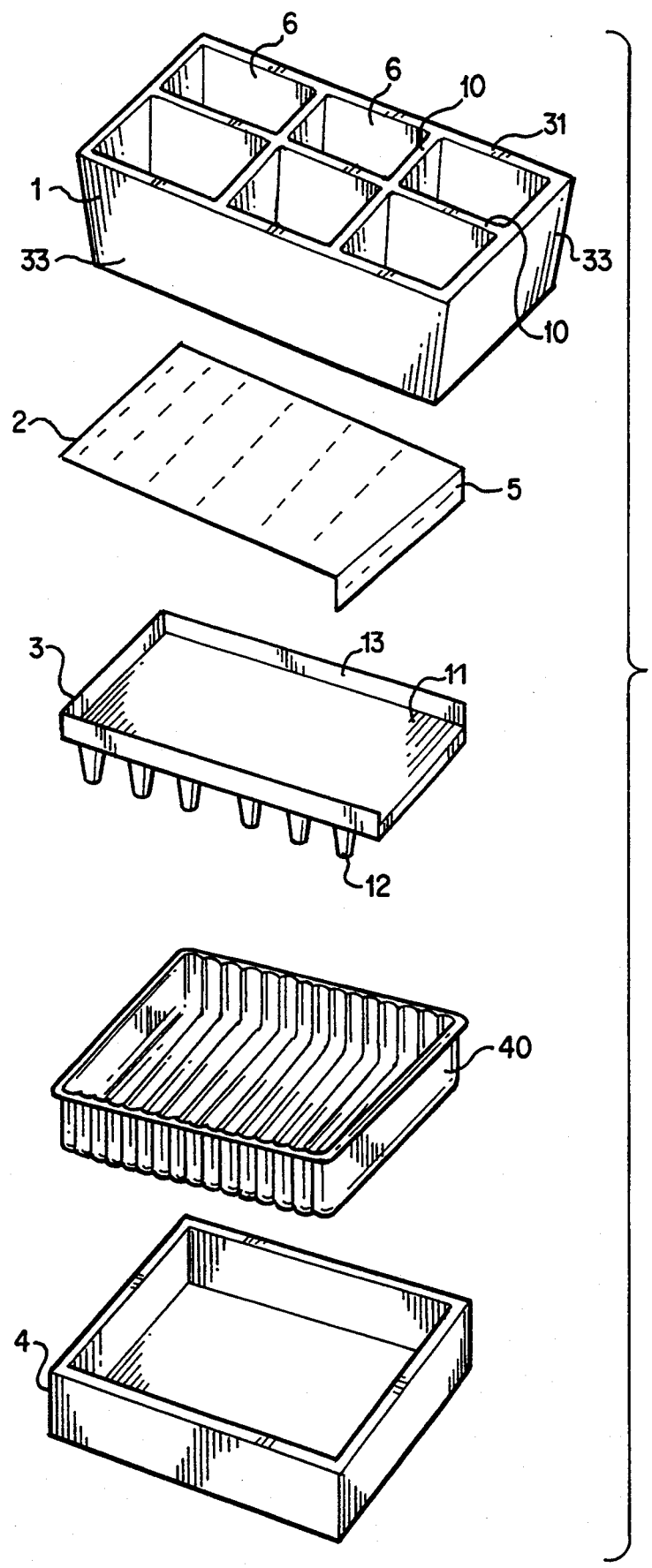
FIG. 1 is an exploded view of a preferred embodiment of a multi-cell tray assembly according to the present invention.
Figure 2:
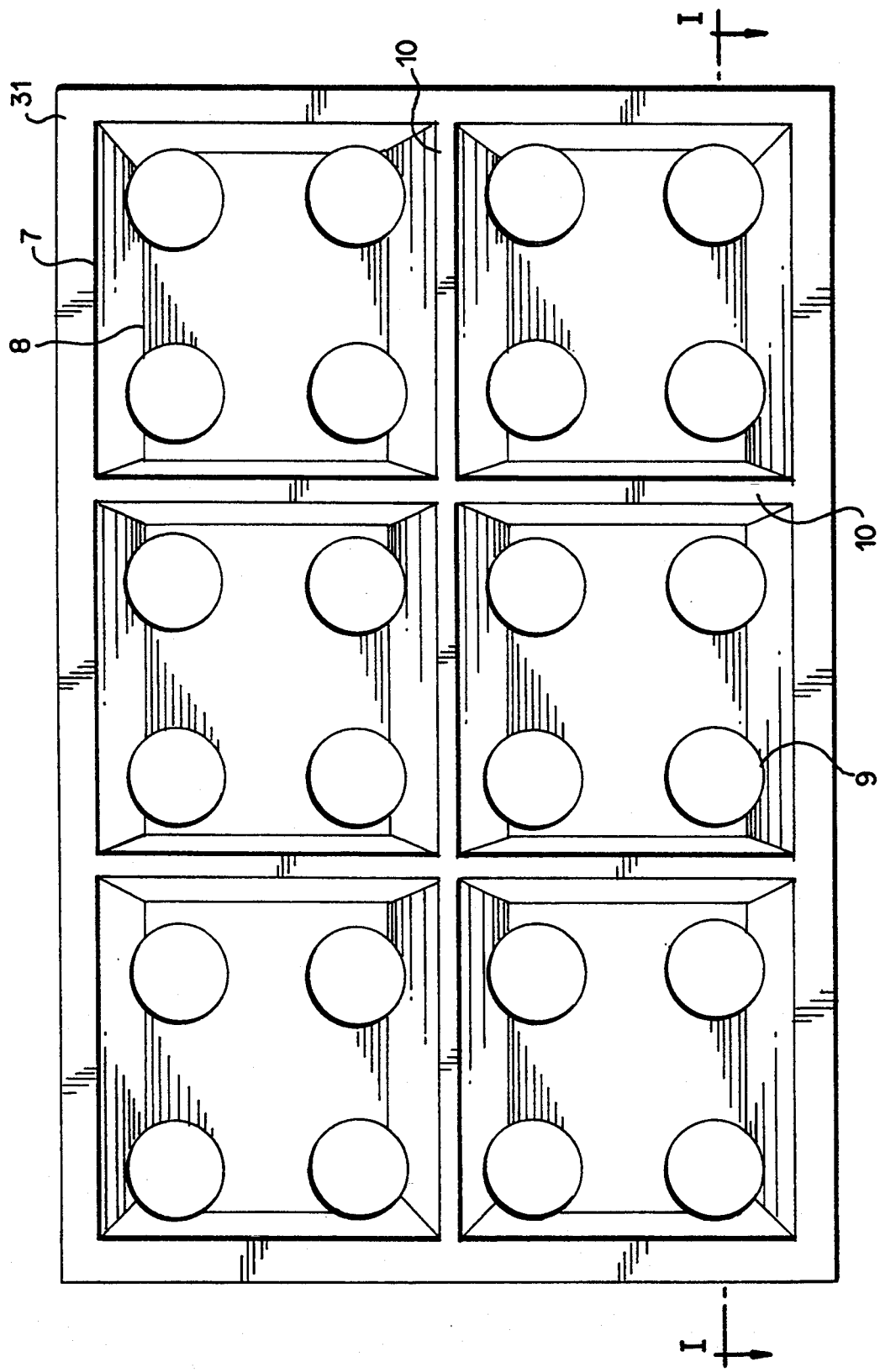
FIG. 2 is a top view of a multi-cell tray according to a preferred embodiment of the present invention.
Figure 3:
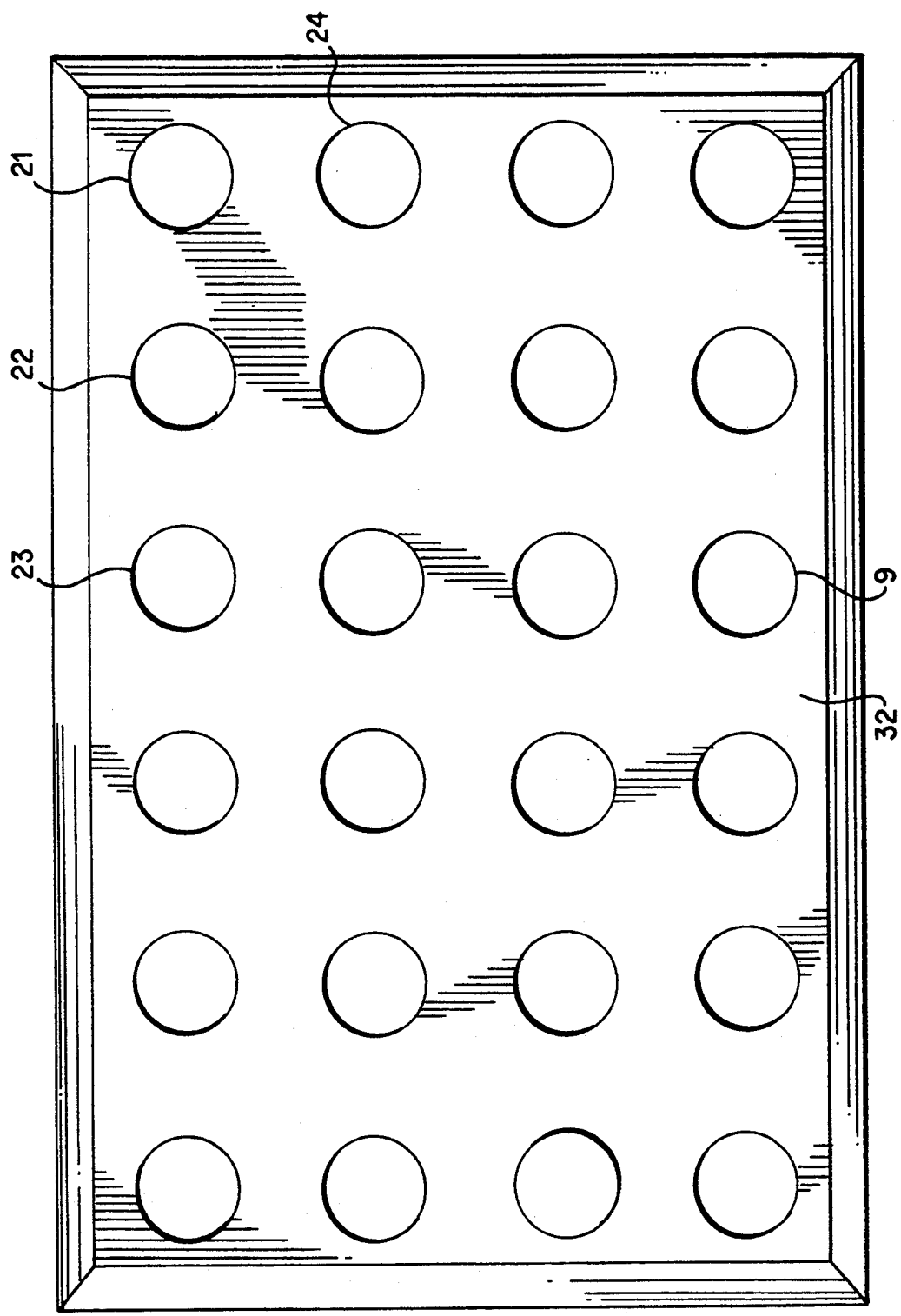
FIG. 3 is a bottom view of the multi-cell tray of FIG. 2.
Figure 4:
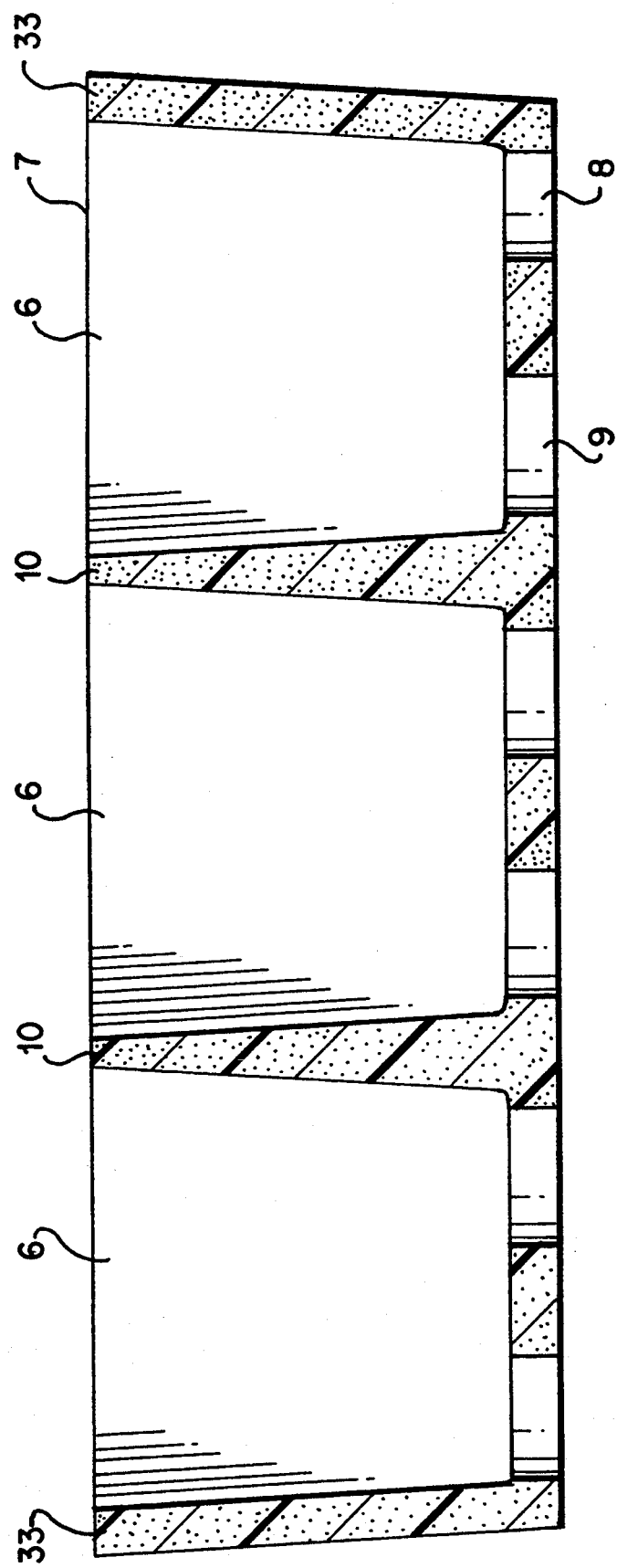
FIG. 4 is a cross-sectional side view taken along line I—I of FIG. 2.
Figure 5:
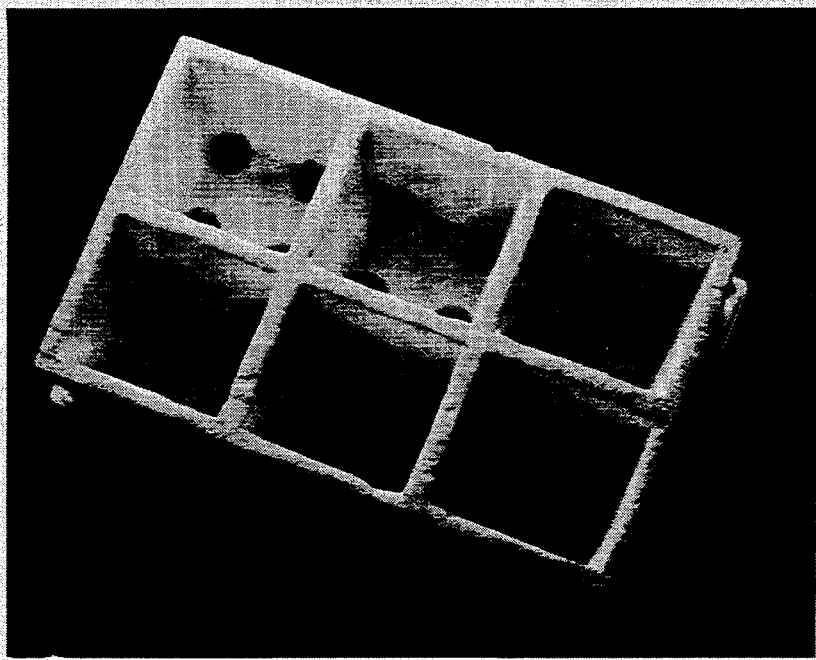
FIG. 5 is a top perspective view of the assembly shown in FIG. 1.

As shown in FIG. 1, a preferred embodiment of the present invention shows the multi-cell tray assembly including multi-cell tray 1, capillary matting 2, support 3 for the capillary matting and the tray, and water reservoir 4. While being employed for growing plants, support 3 sets inside reservoir 4. Matting 2 is supported on support 3, with side portions 5 extending into water in reservoir 4. Matting 2 is made of known porous capillary materials, and water is transferred from reservoir 4 across the surface of the matting through capillary action. An exemplary capillary matting is available from Accelerated Propagation, Ltd., Vines Cross, Heathfield, Suffex, England. Tray 1 comprises a top surface 31, bottom 32 and sides 33, with cells 6 formed therein. Bottom 32 rests on matting 2, thereby providing water to transplant mix contained in cells of the tray through holes 9 in the bottom floor of the cells. Plants contained in the cells do not need to be regularly watered, since water is provided to the transplant mix from the reservoir through the capillary matting.

Suitable materials for the tray 1, support 3 and reservoir 4 include, e.g., polystyrene foam, which advantageously also serves as insulation. Other useful materials, such as clay or plastic, will be readily apparent to one skilled in the art. When reservoir 4 is constructed of a polystyrene foam which is not waterproof, the reservoir can be provided with a waterproof liner 40. Liner 40 is preferably rigid and nests inside the reservoir. Liner 40 can be molded to include lateral ribs across the bottom and two opposite sides as shown in FIG. 1. A suitable material is a molded plastic, such as polyethylene.

As shown in the accompanying drawing figures, tray 1 includes cells 6 for containing transplanted plants formed between sides 33 of the tray, and each cell is separated from an adjacent cell by partition walls 10 integral with the tray. The cells are sufficiently large to permit the root growth of a plant contained therein, such as tomatoes, eggplants, dahlias and other large transplants, until the plant is ready for transplanting to a garden environment. Each cell 6 preferably has the same size. Preferred dimensions of each cell 6 are as follows: a top opening 7 having a substantially rectangular shape with an area of about 9 to about 64 sq. in., wherein each side of the rectangle has a length of about 3 to about 8 inches; a bottom floor 8 no larger in area than top opening 7 and having a substantially rectangular shape with an area of about 5 to about 36 sq. in., wherein each side of the rectangle has a length of about 2.25 to about 6 inches; and a depth of about 3 to about 8 inches. For example, top opening 7 can be defined by a rectangle wherein two opposed sides each have a length of about 4 in. and two other opposed sides each have a length of about 4.125 in., bottom floor 8 can be defined by a rectangle wherein two opposed sides each have a length of about 3 in. and two other opposed sides each have a length of about 3.69 in., and the cell can have a height of about 4 in. Cells 6 can be differently shaped, for example, wherein the top opening or the bottom floor is circular, provided that the cells have a similar volume as for the above-described configuration.

Preferably, tray 1 comprises at least 4 cells and no more than 12 cells arranged in multiple, adjacent rows to facilitate the growth of several transplants, while providing a tray which can easily be handled. A preferred arrangement is shown in the accompanying drawing figures, wherein tray 1 has six cells arranged in two adjacent rows containing three cells each.

Each cell 6 comprises at least four holes 9 in the bottom floor 8 which are of sufficient size to provide enough water to transplant mix contained in the cell. Additionally, each hole 9 is small enough to prevent loss of transplant mix through the holes. Each hole has a preferable area of about 0.75 sq. in. to about 2.25 sq. in. For example, holes 9 can be circular and have a diameter of about 1 to about 1.5 in. A preferred diameter of holes 9 is about 1.25 in. In a preferred arrangement, each cell has 4 holes near each of the corners of the bottom floor, as shown in the drawing figures. Holes 9 can have a different shape, such as a rectangular opening, wherein each side of the rectangle has a length of about 1 to about 1.5 in.

As shown in FIG. 1, support 3 is in the form a pegboard, which comprises a substantially planar top surface 11 having pegs 12 extending from the bottom of pegboard 3. Pegs 12 are preferably round tapered pegs, and the pegs are arranged to correspond to the arrangement of holes 9 in the bottom of tray 1. The top surface of pegboard 3 preferably includes ridges 13 extending from 3 sides thereof. The fourth side contains no ridge to permit side portion 5 of capillary matting to extend into water in the reservoir. While the tray assembly is employed to grow transplants, pegboard 3 is positioned as shown in FIG. 1, so that pegs 12 rest in reservoir 4 and matting 2 rests on surface 11. When the plants are ready for removal from tray 1, the pegboard can be inverted and placed on a level surface with pegs 12 extending upward, and tray 1 can be placed directly on pegboard 3, such that pegs 12 extend through holes 9, thereby facilitating the removal of plants from the cells.

In a preferred embodiment, each hole in the tray is spaced equally from an adjacent hole to assist in this operation of removing plants with the pegboard. In other words, the spacing between holes 21 and 22 is the same as the spacing between holes 22 and 23, holes 21 and 24, and so forth. For the preferred embodiment shown in the drawing figures, wherein the tray has six cells each having 4 holes, and each hole is equally spaced from an adjacent hole, the same pegboard currently used for known trays having smaller cells and a single hole can be used for the tray according to the present invention.

What is claimed is:

1. In a tray assembly for containing plants comprising cells having an open top and side walls extending from the top to a bottom floor, the improvement wherein the floor of each of said cells has at least four holes therein, each having an area of 0.75 to 2.25 sq. in., and further comprising a support having opposing faces, one of which is planar, the other having pegs projecting therefrom, said pegs arranged to correspond with the holes.

* * * * *